United States Patent [19]
Kitazawa

[11] Patent Number: 5,815,140
[45] Date of Patent: Sep. 29, 1998

[54] MOUSE WITH A MOVABLE CLEANING MEMBER

[75] Inventor: Yukio Kitazawa, Gunma, Japan

[73] Assignee: NEC Corporation, Tokyo, Japan

[21] Appl. No.: 563,000

[22] Filed: Nov. 27, 1995

[30] Foreign Application Priority Data

Nov. 28, 1994 [JP] Japan .................................. 6-292834

[51] Int. Cl.[6] .................................................. G09G 3/02
[52] U.S. Cl. ...................... 345/164; 345/167; 345/184; 345/163
[58] Field of Search ................................. 345/163, 164, 345/167, 156, 157, 165, 176, 168, 179, 166; 74/471; 250/221; 178/18

[56] References Cited

U.S. PATENT DOCUMENTS

| | | | |
|---|---|---|---|
| 4,881,065 | 11/1989 | Soma et al. | 345/164 |
| 5,214,415 | 5/1993 | Pandolei | 345/164 |
| 5,436,616 | 7/1995 | Futatsugi et al. | 345/164 |
| 5,486,845 | 1/1996 | Chait | 345/163 |

FOREIGN PATENT DOCUMENTS

277741  6/1990  Japan .

*Primary Examiner*—Steven J. Saras
*Assistant Examiner*—John Suraci
*Attorney, Agent, or Firm*—Whitman, Curtis & Whitham

[57] ABSTRACT

A pointing device includes a housing, a ball, and a cleaning member. Part of the ball protrudes from an opening of the housing. The cleaning member is pressed against the ball by a mechanism including a rod and a resilient member. The rod is made slidably movable in first and second directions. One end of the rod is connected to the cleaning member. The other end of the rod protrudes from a hole of the housing to form a button. The cleaning member is brought into contact with the ball when the button is pushed in the first direction. The resilient member forces the rod in the second direction to separate the cleaning member from the ball during normal operation.

20 Claims, 2 Drawing Sheets

5,815,140

MOUSE WITH A MOVABLE CLEANING MEMBER

BACKGROUND OF THE INVENTION

The present invention relates to a pointing device such as a mouse, for a computer or the like, and, more particularly, to a mouse having a cleaning member for removing dirt attached on the surface of a ball contained therein.

A mechanical mouse or an opto-mechanical mouse has a ball which is put on a surface (e.g., a desk) and rolled as the mouse is moved. When the mouse is used for a long period of time, dirt accumulates on the ball. The dirt on the ball prevents the ball from rolling smoothly. If the ball does not roll smoothly, the mouse cannot measure the movement precisely.

Referring to FIG. 1, the conventional mouse comprises a ball 12. The ball 12 is contained in a housing 11. Rotary sensors 16a and 16b are provided in the housing 11. The rotary sensors 16a and 16b are connected to shafts 18a and 18b, respectively. Rollers 17a and 17b are attached around the shafts 18a and 18b, respectively. The rollers 17a and 17b make contact with the ball 12. The rotary sensors 16a and 16b are positioned so that the shaft 18a is substantially perpendicular to shaft 18b.

As the mouse is moved, the ball 12 turns the rollers 17a and 17b. The rotations of the roller 17a and 17b are transmitted to the rotary sensors 16a and 16b via the shafts 18a and 18b, respectively. The rotary sensors 16a and 16b measure the rotation of the shafts 17a and 17b, respectively, and generate signals representing the movement of the mouse. However, for satisfactory operation, any motion of housing 11 must be transmitted to rotary sensors 16a and 16b through ball 12, rollers 17a and 17b and shafts 18a and 18b, respectively. Dirt accumulated on the ball can impede both rolling of the ball on a surface and transmission of motion from ball 12 to rollers 17a and 17b.

An example of a conventional mouse having a cleaning member for removing the dirt on the ball is disclosed in Japanese Published Unexamined Utility Model Application No. 77741/1990.

Brushes 13a and 13b, which is a key feature of this conventional mouse, are provided in the housing 11. The brushes 13a and 13b are located in a fixed position, either rigidly or resiliently and sweep the surfaces of the roller 17a and 17b, respectively. As the ball 12 rolls, the dirt attached on the ball 12 is transferred from the ball 12 to the rollers 17a and 17b. Thereafter, the dirt on the roller 17a and 17b is removed by the brushes 13a and 13b, respectively.

If the brushes 13a and 13b were arranged to sweep the surface of the ball 12, the brushes 13a and 13b would interfere with the smooth rotation of the ball 12. Therefore, the conventional mouse removes the dirt on the ball 12 indirectly by removing the dirt on the rollers 17a and 17b with the brushes 13a and 13b, respectively.

However, the conventional mouse has the following problems. First, the brushes 13a and 13b cannot remove the dirt on the ball 12 sufficiently because the brushes 13a and 13b indirectly remove the dirt on the ball 12. Second, large power is needed to move the mouse because of the friction produced by the brushes 13a and 13b. Third, transfer of dirt from the ball 12 to rollers 17a, 17b is also inefficient because of the small area of contact between ball and roller. Moreover, this mechanism for transfer of dirt is capable of removing dirt only after the possibility of interference of dirt with the mouse's function has occurred.

SUMMARY OF THE INVENTION

In view of the aforementioned problems of the present invention, one object of the present invention is to remove the dirt on the ball efficiently and before any possible interference with the mouse function.

Another object of the present invention is to remove the dirt on the ball without the effects on the movement measurement.

Yet another object of the present invention is to avoid friction produced by a cleaning member while the operator uses the mouse.

According to the present invention, a pointing device includes a housing, a ball, and a cleaning member. The housing is provided with a hole. The ball is contained in the housing, and part of the ball protrudes from the hole of the housing. The cleaning member is provided in the housing. The pointing device is provided with a mechanism for selectively pressing the cleaning member against the ball.

The mechanism for pressing the cleaning member may include a rod and a resilient member. The rod is made slidably movable in first and second directions along an axis thereof. The rod has first and second ends. The first end of the rod is connected to the cleaning member. The cleaning member is brought into contact with the ball when the rod is pushed toward the first direction. The resilient member forces the rod in the second direction.

The cleaning member may include a pad or a brush.

The housing may have a second hole. The second end of the rod protrudes from the second hole of the housing.

BRIEF DESCRIPTION OF THE DRAWINGS

Other objects, features and advantages of the present invention will become more apparent when the following description is read in conjunction with the accompanying drawings, wherein.

In these drawings, the same reference numerals depict the same parts, respectively.

DETAILED DESCRIPTION OF THE PREFERRED EMBODIMENTS

Figure 1:
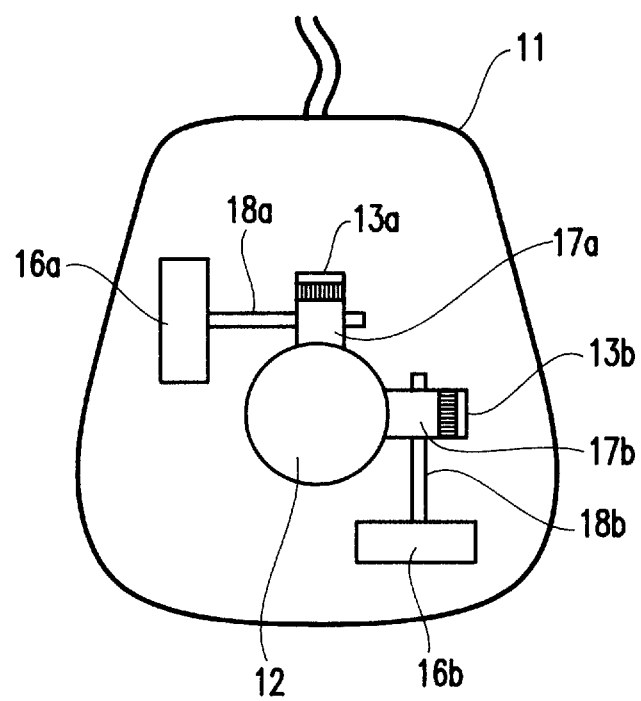
FIG. 1 shows the structure of a conventional mouse.
Figure 2:
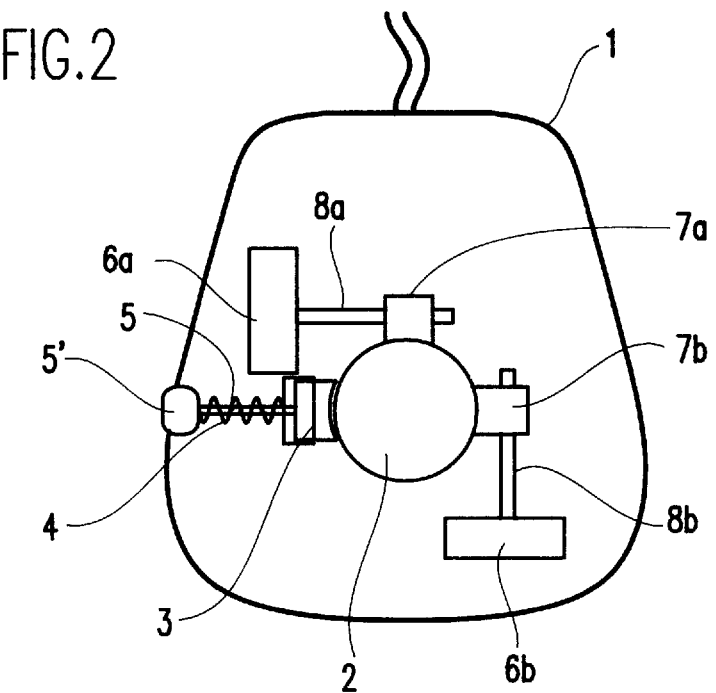
FIG. 2 is a bottom cross-sectional view of the structure of the mouse according to the present invention.
Figure 3:
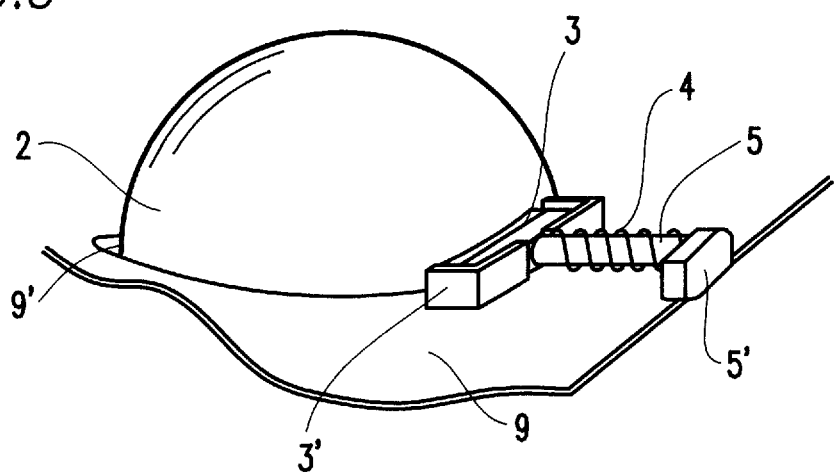
FIG. 3 is a perspective view of the detailed structure of the mouse according to the present invention.

Referring to FIGS. 2 and 3, a mouse according to an embodiment of the present invention comprises a base 9 having a circular hole 9'. A ball 2 is placed on the base 9 so that the lower portion of the ball 2 is received in the hole 9' of the base 9. The lower tip of the ball 2 protrudes from the hole 9' and touches a surface (e.g., a desk or a mouse pad) when the mouse is put on the surface.

The mouse includes rotary encoders 6a and 6b (e.g., a mechanical rotary encoder or an opto-mechanical rotary encoder) receiving shafts 8a and 8b, respectively. The mechanism by which rotary sensors 16a and 16b develop signals in response to rotary motion is not important to the practice of the invention. Rollers 7a and 7b are attached around the shafts 8a and 8b, respectively. The rotary encoders 6a and 6b are positioned so that the shafts 8a and 8b form an angle of approximately 90° therebetween.

When the mouse is put on a surface, the ball 2 touches the rollers 7a and 7b. As the mouse is moved, the rolling motion of the ball 2 turns the rollers 7a and 7b. The rotations of the roller 7a and 7b are transmitted to the rotary encoders 6a and 6b via the shafts 8a and 8b, respectively. The rotary encoders 6a and 6b measure the rotation of the shafts 7a and 7b, respectively, and generate movement signals. The movement signals generated by the rotation encoder 6a and 6b indicate the vertical and lateral movements, respectively.

The mouse in accordance with the invention includes a cleaning mechanism which includes a cleaning member 3 and a rod 5. One end of the rod 5 is attached to the cleaning member 3. Another end of the rod 5 is enlarged to form a button 5'.

The cleaning member 3 is, for example, a pad made of felt or the like. Other devices such as a brush can be used as the cleaning member 3.

A flange 3' is formed on the base 9. The flange 3' has a notch. The cleaning member 3 is placed in a space between the ball 2 and the flange 3'. The rod 5 is received in the notch of the flange 3'. The rod 5 is slidably movable through the notch in the lateral direction.

A spring 4 is interposed between the flange 3' and the button 5' of the rod 5. The spring 4 pushes the rod 5 so that the cleaning member 3 is separated from the ball 2. When the operator pushes the button 5', the cleaning member 3 is pressed toward the ball 2. Other resilient members can be used instead of the spring 4.

The base 9 is preferably covered with a case 1 having a hole. The aforementioned elements of the mouse are contained in a space between the base 9 and the case 1. The button 5' of the rod 5 protrudes from the hole of the case 1. The particular housing configuration is not critical to the practice of the invention but should preferably be designated to place button 5' in a convenient location for the user.

During normal operation, the button 5' is not pressed, and the cleaning member 3 is separated from the ball 2 and does not produce friction. The mouse operates in the same way as the conventional mouse.

Nevertheless the operator may periodically remove the dirt on the ball 2 by pushing the button 5' when the mouse is moved. The cleaning member 3 is then pressed against the ball 2. As the ball 2 rolls, the cleaning member 3 wipes the surface of the ball 2. Thus, the dirt on the ball 2 is removed. Removal of dirt can be done while the mouse is operated since the user can limit friction by limiting pressure on button 5'.

According to the present invention, the dirt on the ball 2 is more efficiently removed because the cleaning member 3 wipes the ball 2 to remove the dirt from the ball 2 directly. By the same token, normally the cleaning member 3 does not produce friction because the cleaning member 3 is separated from the ball 2 due to the spring 4.

The present embodiment is to be considered in all respects as illustrative and not restrictive, the scope of the invention being indicated by the appended claims rather than by the foregoing description and all changes which come within the meanings and range of equivalency of the claims are therefore intended to be embraced therein. For example, the present invention can be applied to other pointing devices having a ball such as a trackball.

What is claimed is:

1. A pointing device comprising:

a housing having a hole;

a ball within said housing, part of said ball protruding from said hole of said housing;

a cleaning member within said housing; and means within said housing for pressing said cleaning member against said ball only when said ball needs cleaning.

2. A pointing device comprising:

a housing having a hole;

a ball within said housing, part of said ball protruding from said hole of said housing;

a cleaning member within said housing; and means within said housing for pressing said cleaning member against said ball, wherein said means comprises:

a rod slidably movable in first and second directions along an axis thereof, said rod having first and second ends, said first end of said rod being connected to said cleaning member, said cleaning member being brought into contact with said ball when said rod is pushed toward said first direction; and a resilient member biasing said rod in said second direction.

3. A pointing device according to claim 1, wherein said cleaning member comprises a pad.

4. A pointing device according to claim 1, wherein said cleaning member comprises a brush.

5. A pointing device according to claim 2, wherein said housing has a second hole, said second end of said rod protruding from said second hole of said housing.

6. A pointing device according to claim 1, further comprising a detector for detecting rotation of said ball.

7. A pointing device according to claim 6, wherein said detector comprises:

a shaft rotatable about an axis thereof;

a roller attached around said shaft and contacting said ball; and an encoder attached to said shaft and detecting rotation of said shaft.

8. A pointing device according to claim 6, wherein said detector comprises first and second detector members, said first and second detector members detecting rotation of said ball in first and second directions, respectively, and wherein said first and second directions are substantially orthogonal to one another.

9. A pointing device according to claim 1, wherein said pointing device comprises a mouse.

10. A pointing device according to claim 1, wherein said pointing device comprises a trackball.

11. A pointing device comprising:

a housing having a hole and an actuator;

a ball positioned within said housing, wherein a portion of said ball protrudes from said hole;

a cleaning member, positioned within said housing, operatively connected to said actuator for contacting said ball only when said actuator is actuated.

12. A pointing device according to claim 11, further comprising:

a rod having a first end connected to said cleaning member and a second end connect to said actuator.

13. A pointing device according to claim 11, wherein said cleaning member comprises a pad.

14. A pointing device according to claim 11, wherein said cleaning member comprises a brush.

15. A pointing device according to claim 12, wherein said housing has a second hole, said second end of said rod protruding from said second hole.

16. A pointing device according to claim 11, further comprising a detector for detecting rotation of said ball.

17. A pointing device according to claim 16, wherein said detector comprises:

a shaft rotatable about an axis thereof;

a roller, attached to said shaft, for contacting said ball; and an encoder, attached to said shaft, for detecting rotation of said shaft.

18. A pointing device according to claim 16, wherein said detector comprises first and second detector members, said first and second detector members detecting rotation of said ball in first and second directions, respectively, and wherein said first and second directions are substantially orthogonal to one another.

19. A pointing device according to claim 11, wherein said pointing device further comprises a resilient member, connected to said actuator, for preventing contact between said cleaning member and said ball when said actuator is deactuated.

20. A pointing device according to claim 11, wherein said cleaning member contacts said ball only when said ball contains includes contaminates.

* * * * *